United States Patent [19]

Meisner et al.

[11] Patent Number: 5,447,023

[45] Date of Patent: Sep. 5, 1995

[54] SYNTHESIZED FUEL FLOW RATE AND METERING VALVE POSITION

[75] Inventors: Richard Meisner, Glastonbury; Matthew J. Schryver, Rocky Hill, both of Conn.

[73] Assignee: United Technologies Corporation, Hartford, Conn.

[21] Appl. No.: 265,565

[22] Filed: Jun. 24, 1994

Related U.S. Application Data

[63] Continuation of Ser. No. 73,241, Jun. 8, 1993, abandoned, which is a continuation of Ser. No. 906,988, Jun. 30, 1992, abandoned.

[51] Int. Cl.[6] .......................... F02C 9/00; F02G 3/00
[52] U.S. Cl. ................................ 60/39.02; 60/39.03; 60/39.26; 60/39.281
[58] Field of Search .................. 60/39.02, 39.03, 39.26, 60/39.281

[56] References Cited

U.S. PATENT DOCUMENTS

| | | | |
|---|---|---|---|
| 3,971,208 | 7/1976 | Schwent | 60/39.281 |
| 4,000,607 | 1/1977 | Bolliger | 60/39.281 |
| 4,117,668 | 10/1978 | Elsaesser et al. | 60/39.281 |
| 4,248,040 | 2/1981 | Kast | 60/39.281 |
| 4,274,254 | 6/1981 | Jansen et al. | 60/39.281 |
| 4,275,557 | 6/1981 | Marvin et al. | 60/39.03 |
| 4,453,378 | 6/1984 | Zagranski et al. | 60/39.02 |
| 4,651,518 | 3/1987 | McLaughlin et al. | 60/39.02 |
| 4,765,133 | 8/1988 | Krukoski et al. | 60/39.281 |
| 4,773,213 | 9/1988 | Krukoski et al. | 60/39.03 |

OTHER PUBLICATIONS

United Technologies Pratt & Whitney, Aeronautical Vestpocket Handbook, Aug. 1986, (pp. 129-137).

Primary Examiner—Richard A. Bertsch
Assistant Examiner—Howard R. Richman

[57] ABSTRACT

A method and apparatus is disclosed for synthesizing a fuel flow and a metering valve position used in a fuel control system of a turbomachine. Various construction details have been developed which provide a method to manipulate conventional turbine engine parameters to generate a synthesized fuel flow signal and metering valve position signal. In one embodiment, a synthesis means includes means to sense temperature, pressure and high pressure shaft speed, and means to manipulate the sensed signals to generate a synthesized fuel flow. A function generator responds to the synthesized fuel flow signal to generate a synthesized metering valve position signal.

18 Claims, 1 Drawing Sheet

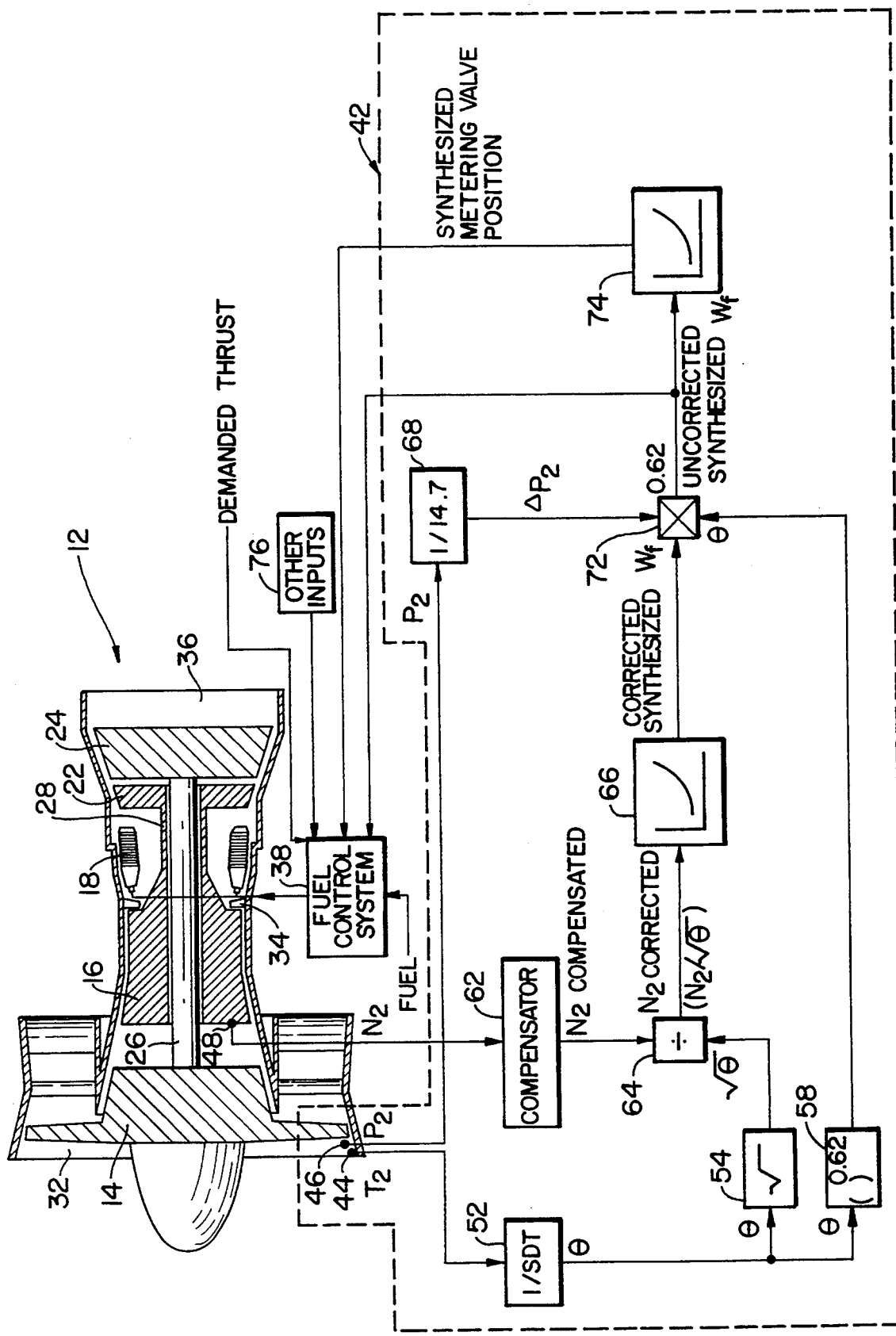

SYNTHESIZED FUEL FLOW RATE AND METERING VALVE POSITION

This is a continuation of application Ser. No. 09/073,241, filed on Jun. 8, 1993, which is a continuation of application Ser. No. 078/906,988, filed Jun. 30, 1992, both of which are now abandoned.

TECHNICAL FIELD

This invention relates to fuel controls for gas turbine engines, and more particularly to a method and apparatus for synthesizing a fuel flow and a metering valve position.

BACKGROUND ART

In a typical fuel control system of a gas turbine engine, the fuel control system adjusts the fuel flow to meet the operator's demands. The objective of the fuel control system is to be responsive to the operator's demand while at the same time protecting against stall, surge, or inefficient operation of the engine. The fuel control system monitors certain parameters of the engine and inputs the parameters into a variety of fuel flow schedules to optimize the operation of the engine.

One of the parameters which is monitored by the fuel control system is the fuel metering valve position. The fuel metering valve meters the rate of fuel flow to the engine. Monitoring the fuel metering valve position provides a feedback to the control system to determine changes which are required to meet the operator's demand. The fuel metering valve position is also necessary to provide updates as to hardware characteristics to ensure proper biasing of the fuel metering valve. The fuel metering valve is positioned by a torque motor. The torque motor has a null bias which ensures that the failsafe position of the metering valve corresponds to a minimum flow condition.

A failure in the monitoring of the fuel metering valve position generally leads to a failsafe positioning of the fuel metering valve. For safety reasons, the failsafe position is a minimum flow position. This position may result in an engine shut down. The frequency of engine shut downs during flight is referred to as the in-flight shut down (IFSD) rate. It is desirable to minimize the IFSD rate. One means to minimize the IFSD rate is to build redundancy into the fuel control system. While providing backup controls and inputs is one solution, it increases the cost, weight and complexity of the fuel control system.

DISCLOSURE OF THE INVENTION

According to the present invention, a method to synthesize a fuel flow includes the steps of sensing engine inlet temperature, sensing engine inlet pressure, sensing engine high pressure shaft speed, and manipulating the sensed signals to generate a synthesized fuel flow.

According further, a method to synthesize a metering valve position includes manipulating the synthesized fuel flow to generate a synthesized metering valve position.

According further, a turbomachine includes means to synthesize the metering valve position, the synthesis means including means to sense temperature, pressure and shaft speed, and means to manipulate the sensed signals to generate a synthesized fuel flow.

According further, a fuel control system for a turbomachine includes means to sense temperature, pressure and shaft speed, and means to manipulate the sensed signals to generate a synthesized fuel flow.

A primary feature of the present invention is the sensing of conventional engine parameters. Another feature of the present invention is a manipulation of the conventional engine parameters to generate a synthesized fuel flow. A further feature of the present invention is the manipulation of the conventional engine parameters to generate a synthesized metering valve position.

A primary advantage of the present invention is validation of the fuel control system as a result of the availability of the synthesized[fuel flow and the synthesized metering valve position to validate sensed fuel flows and sensed metering valve positions. A further advantage is the facilitation of generating the synthesized fuel flow and metering valve position as a result of using conventionally monitored engine parameters. Another advantage is the level of the in-flight shut down rate which results from having a synthesized fuel flow and a synthesized metering valve position signal available as a backup within a fuel control system.

The foregoing and other objects, features and advantages of the present invention will become more apparent in light of the following detailed description of the exemplary embodiments thereof, illustrated in the accompanying drawings.

DESCRIPTION OF THE DRAWINGS

The sole FIGURE is a block diagram schematically illustrating a method to synthesize fuel flow and metering valve position.

BEST MODE FOR CARRYING OUT THE INVENTION

Illustrated in the drawing is an axial flow gas turbine engine 12 including a low pressure compressor 14, a high pressure compressor 16, a combustor 18, a high pressure turbine 22, and a low pressure turbine 24. The low pressure compressor and low pressure turbine are connected by a low pressure shaft 26. The high pressure compressor and the high pressure turbine are interconnected by a high pressure shaft 28. Working fluid enters the gas turbine engine through an inlet and passes through the low pressure compressor and the high pressure compressor. The compressors add energy in the form of increased momentum to the working fluid. The working fluid then enters the combustor where it is mixed with fuel and combusted. The fuel enters the combustor through a plurality of fuel injectors 34. The products of combustion are expanded through the high pressure turbine section and the low pressure turbine. A portion of the energy extracted from the working fluid in the high pressure turbine and low pressure turbine is transferred to the compressor sections via the shafts. The working fluid is exhausted from the low pressure turbine through the outlet 36.

The output of the gas turbine engine, in terms of thrust, is controlled in part by the rate of fuel flow into the combustor. The rate of fuel flow to the combustor is determined by a fuel control system. 38. The fuel control system illustrated in FIG. 1 represents a conventional fuel control system. The fuel control system receives inputs from various engine parameters, such as temperature, pressure, and shaft speed. The fuel control system manipulates these sensed signals, known hardware characteristics, and fuel flow schedules to provide a responsive control system for the gas turbine engine.

As shown in the drawing, the gas turbine engine includes means 42 to synthesize the rate of fuel flow of the gas turbine engine. The synthesis means includes an inlet temperature sensor 44, an inlet pressure sensor 46, and a high pressure shaft speed sensor 48. The sensors produce the signals used in the synthesis means. The sensors are conventional sensors of the type typically used in gas turbine engine fuel control systems. The synthesis means manipulates these signals to generate an estimated fuel flow $W_f$ for the gas turbine engine. The $W_f$ generated can then further be manipulated to generate a metering valve position.

More specifically, the inlet temperature signal $T_2$ is input to a divider means 52. The divider means uses the inlet temperature signal $T_2$ as the numerator and the standard day temperature (SDT) as the denominator to generate a normalized temperature signal $\theta$. The normalized temperature signal $\theta$ is input to means for taking the square root 54, which produces a signal equal to the square root of the normalized temperature signal $\sqrt{\theta}$, and also to means to take the 0.62 root of a signal 58.

The high pressure shaft speed $N_2$ is transformed to a compensated shaft speed ($N_2$ COMPENSATED) by being input to a compensator 62. The compensator accounts for transient functions, such as acceleration and deceleration modes, which are present as the engine output changes from one steady state condition to another. The transient functions smooth out the transition between steady state conditions. $N_2$ COMPENSATED and the square root of the normalized temperature signal $\theta$ are then input to a divider 64 which divides $N_2$ COMPENSATED by the square root of the normalized temperature signal $\theta$ to produce a corrected shaft speed ($N_2$ CORRECTED). $N_2$ CORRECTED is input to a function generator 66 which responds to $N_2$ CORRECTED to generate a corrected synthesized fuel flow $W_f$ as a function of $N_2$ Corrected.

$N_2$ CORRECTED is used to simplify the generation of the corrected, synthesized $W_f$. Correcting the high pressure shaft speed $N_2$ by the inlet temperature, itself normalized by standard day temperature characteristics, results in a signal which is functionally related to the corrected, synthesized $W_f$. In effect, the synthesis of corrected $W_f$ is reduced to a function of a single variable, in this case $N_2$ CORRECTED.

The corrected, synthesized $W_f$ is uncorrected by multiplier 72 being multiplied by a normalized pressure signal $\Delta P_2$ and the 0.62 root of the normalized temperature. The inlet pressure signal $P_2$ is converted to the normalized pressure signal $\Delta P_2$ by inputting the inlet pressure signal to a divider 68 which divides the inlet pressure signal by the standard day sea level pressure (14.7 psi) to produce the normalized pressure signal $\Delta P_2$. The normalized pressure signal $\Delta P_2$, the 0.62 root of normalized temperature, and the corrected, synthesized $W_f$ is input to a multiplier 72. The output of the multiplier is the uncorrected synthesized $W_f$, which is input to a second function generator 74 and is branched off and input directly into the fuel control system.

The second function generator responds to the uncorrected synthesized fuel flow to generate a synthesized metering valve position as a function of $W_f$. The synthesized metering valve position signal, the uncorrected synthesized fuel flow signal and a plurality of other control signals 76 are then input to the fuel control system. The fuel control system manipulates the input signals to generate a fuel flow to meet the operator's demand for thrust, one of the inputs to the fuel control 39.

During operation, the inlet temperature, inlet pressure and high pressure shaft speed are continually monitored and the monitored signals $T_2$, $P_2$ and $N_2$ are input into the synthesis means 42. The synthesis means generates the uncorrected synthesized $W_f$ and synthesized metering valve position, which are input into the fuel control system. Within the fuel control system, the synthesized signals may be utilized to provide validation of the $W_f$ being input into the gas turbine engine. A significant discrepancy between the synthesized $W_f$ and the actual $W_f$ may indicate a need for maintenance. In addition, the synthesized metering valve position may be used to validate the sensed metering valve position feedback signal used within the fuel control system. A significant discrepancy may indicate a need for maintenance of the metering valve position sensor or the feedback signal. The synthesized signals may also be used to provide a determination of whether to switch to backup control systems and/or sensors. A further application of the synthesized signals may be as a backup control signal within the fuel control system, either as the signal input into the fuel metering unit or as a signal used to determine the gains and offsets used in typical fuel control systems.

Although the invention has been shown and described with respect to detailed embodiments thereof, it should be understood by those skilled in the art that various changes, omissions, and additions may be made therein and thereto, without departing from the spirit and scope of the invention.

We claim:

1. A turbomachine including a compressor section, a combustor, a turbine section, a shaft joining the compressor section and the turbine section, a source of fuel, means for regulating a flow of fuel from the source to the combustor, and means for synthesizing a rate of fuel flow corresponding to an engine operational condition, the means for synthesizing comprising:

means for generating a first shaft speed signal;

means for multiplying said first shaft speed signal with a coefficient to produce a second shaft speed signal that is corrected to a standard operating condition;

a first function generator means responsive to the second shaft speed signal for generating a first synthesized fuel signal flow; and means for generating a second synthesized fuel flow signal having a magnitude that is the product of the first synthesized fuel flow signal and a coefficient manifesting the engine operational condition; and said means for regulating a fuel flow receiving said second synthesized fuel flow signal to validate said fuel flow.

2. The turbomachine according to claim 1, wherein the means for regulating the flow of fuel includes a metering valve having a plurality of positions corresponding to a plurality of fuel flows said means for synthesizing further comprising:

means responsive to said second synthesized fuel flow signal for producing a synthesized metering valve position to produce said synthesized rate of fuel flow;

the means for regulating the fuel flow receiving said synthesized metering valve position to validate the metering valve position.

3. The turbomachine according to claim 1, wherein the standard condition is the standard day temperature.

4. The turbomachine according to claim 1, wherein said coefficient manifesting the engine operational condition is inlet pressure adjusted to a standard day pressure using inlet temperature.

5. The turbomachine according the claim 1, wherein said means for synthesizing comprises;
   means for producing said coefficient to produce a second shaft speed signal by generating a correction signal equal to the square root of a normalized temperature signal; and
   divider means for dividing the first shaft speed signal by said correction signal.

6. The turbomachine according to claim 1, wherein the synthesizing means comprises means for providing said coefficient manifesting the engine operational condition by dividing inlet temperature by standard temperature to produce a first value, taking a root function of said first value to produce a second value, dividing inlet pressure by standard pressure to produce a third value, and multiplying the first synthesized fuel flow signal by said second and third values.

7. A fuel control system for a turbomachine, the fuel control system including means to synthesize a rate of fuel flow corresponding to an engine operational condition of the turbomachine, and means to regulate the flow of fuel, the fuel control system including:
   means for generating a first shaft speed signal;
   means for producing a second shaft speed signal having a magnitude that is the first shaft speed signal corrected to a standard operating condition;
   a first function generator, responsive to the second shaft speed signal, for generating a first synthesized fuel flow signal; and
   means for producing a second synthesized fuel flow signal that corresponds to the fuel flow for the engine operational condition by adjusting the magnitude of the first synthesized fuel flow signal as a function of the engine operational condition.

8. The fuel control system according to claim 7, wherein the means to regulate the flow of fuel includes a metering valve having a plurality of positions corresponding to a plurality of fuel flows and further comprises
   means for generating a synthesized metering valve position from the second synthesized fuel flow signal.

9. The fuel control system according to claim 7, wherein inlet temperature is divided by a standard day temperature to produce a value by which the first shaft speed signal is divided to produce said second shaft speed signal.

10. The fuel control system according to claim 7, wherein inlet pressure is divided by standard day pressure to produce a factor by which said first synthesized fuel flow signal is multiplied to produce said second synthesized fuel flow.

11. The fuel control system according to claim 7, wherein said fuel control system further comprises:
    means for providing a coefficient of engine operational condition by dividing inlet temperature by standard temperature to produce a first value, taking a root function of said first value to produce a second value, dividing inlet pressure by standard pressure to produce a third value; and multiplying said first synthesized fuel flow signal by said coefficient to produce said second synthesized fuel flow signal.

12. The fuel control system according the claim 8, wherein said fuel control system further comprises:
    means for providing a coefficient of said engine operational condition by dividing inlet temperature by standard temperature to produce a first value, taking a root function of said first value to produce a second value, dividing inlet pressure by standard pressure to produce a third value; and multiplying said first synthesized fuel flow signal by said coefficient to produce said second synthesized fuel flow signal.

13. A method of controlling a turbomachine having a compressor section, a combustor, a turbine section, a shaft joining the compressor section and the turbine section, a source of fuel, and means to regulate a flow of fuel from the source to the combustor, the turbomachine having an engine operational condition, the method comprising:
    generating a first shaft speed signal corresponding to the engine operational condition;
    producing a second shaft speed signal by correcting said first shaft speed signal to a standard ambient condition;
    generating a synthesized fuel flow signal as a function of the second shaft speed signal; and
    producing a second synthesized fuel flow signal that corresponds to the fuel flow for the engine operational condition that is the product of the first synthesized fuel flow signal and coefficient associated with said operational condition; and
    comparing actual fuel flow and synthesized fuel flow.

14. The method according to claim 13, wherein the means to regulate the flow of fuel includes a metering valve having a plurality of positions corresponding to a plurality of fuel flows, and further including the step of:
    generating a synthesized metering valve position signal as a function of the second synthesized fuel flow signal.

15. The method according to claim 13, further including a step of comparing the second synthesized fuel flow signal to a sensed fuel flow.

16. The method according to claim 14, further including a step of comparing the synthesized metering valve position signal to a metering valve position feedback signal to validate the metering valve position feedback signal.

17. The method according to claim 13, further including a step of generating a normalized inlet temperature signal, and wherein the step of producing a second shaft speed signal includes:
    generating a signal equal to the square root of the normalized temperature signal; and
    dividing the first shaft speed signal by the square root of the normalized temperature signal.

18. The method according to claim 17, further including a step of generating a normalized pressure signal, and wherein the coefficient associated with said operational condition is produced by:
    generating a root function temperature signal from the normalized temperature signal; and
    multiplying the normalized pressure signal and the root function temperature signal.

* * * * *